United States Patent Office 3,547,614
Patented Dec. 15, 1970

3,547,614
REGULATION OF UREA HYDROLYSIS IN SOIL
Arthur F. Peterson, Fort Wayne, Ind., and Charles R. Walter, Jr., Springfield, Va., assignors to Allied Chemical Corporation, New York, N.Y., a corporation of New York
No Drawing. Filed Oct. 24, 1967, Ser. No. 677,767
Int. Cl. C05c 9/00
U.S. Cl. 71—28                     22 Claims

ABSTRACT OF THE DISCLOSURE

Loss of urea nitrogen from soil is reduced by the addition thereto of certain compounds which function as antimetabolites toward urease-producing microorganisms. Pyridine-3-sulfonic acid, desthiobiotin, oxythiamine chloride, gamma-benzene hexachloride and o-chloro-p-aminobenzoic acid can be used for this purpose in combination with urea fertilizers.

This invention relates to the control of urea hydrolysis in the soil. More particularly, it relates to the reduction of the rate of ammonia loss from the soil by regulating microbial production of urease enzyme.

Many soil microorganisms possess the enzyme urease. When urea is applied to the soil as a fertilizer, this enzyme will hydrolyse the urea to produce ammonium ion which is a plant nutrient. The pH of soils receiving urea rises as ammonium ion is produced, and the conversion may proceed so rapidly that free ammonia is lost to the atmosphere, particularly when the buffering capacity of the soil is low. Generally, the rate at which urea nitrogen (in the form of ammonia) is lost from the soil increases with increasing temperature and losses may total from about 10 percent to about 80 percent of the urea applied.

Various methods for controlling urea hydrolysis in the soil have been proposed, including the application of protective coatings to urea prills, and the use of various enzyme poisons, such as metallic salts, triphenylmethane dyes, organic disulfides, and hydroxamic acids in conjunction with urea-containing fertilizers. Generally, such methods suffer from a number of disadvantages. Thus, protective coatings for urea prills (to reduce the rate at which urea is leached into the soil) are expensive and are not applicable to solutions. Metallic salts and many other enzyme inhibitors are either phytotoxic and/or short-lived in the soil.

Therefore, it is an object of the present invention to provide an improved method for minimizing the loss of ammonia from soil to which urea has been applied by controlling the rate of urea hydrolysis.

Another object is to provide a method of controlling the rate of urea hydrolysis in the soil which is economical, non-injurious to plant crops, and of lasting efficacy.

Another object is to provide a method of controlling the rate of urea hydrolysis in the soil which is independent of the manner in which the urea is applied to the soil.

Another object is to provide a urea fertilizer composition which may be applied to the soil without excessive loss of ammonia to the atmosphere.

Yet another object is to provide a urea fertilizer composition which may be applied to the soil without excessive loss of ammonia to the atmosphere and which is economical and easy to use.

Other objects and a fuller understanding of the present invention can be had by reference to the following description and claims.

According to the present invention, the rate of hydrolysis of urea in the soil is regulated, not by limiting the solubility of urea nor by inhibiting the activity of urease, but rather by controlling the microbial production of the enzyme. Specifically, it was found that certain compounds, according to the present invention, when applied to the soil, either individually or in combination, function as antimetabolites (i.e., substances which inhibit the utilization of a metabolite by an organism) toward soil bacteria, fungi, and actinomycetes which synthesize urease. Compounds suitable for use as antimetabolites in the present invention include pyridine-3-sulfonic acid, desthiobiotin, oxythiamine chloride, gamma-benzene hexachloride (i.e., cis - 1,2,4,5 - trans - 3,6 - hexachlorocyclohexane) and o-chloro-p-aminobenzoic acid. Of these, desthiobiotin, oxythiamine chloride, and pyridine-3-sulfonic acid are preferred with pyridine-3-sulfonic acid being especially preferred. These compounds, when employed in accordance with the present invention are effective in eliminating up to about 70% of the ammonia losses to the atmosphere heretofore encountered, are water-soluble, non-phytotoxic, low in cost, stable in combination with urea, and effective in small amounts for long periods in the soil. Such compounds can be admixed with urea in any suitable manner, e.g., in solid form, such as a dust or in aqueous solution, or applied to solid urea in conjunction with a coating. However, for ease of manipulation and economy of operation, the antimetabolite compounds of the present invention are preferably applied in aqueous solution with urea. Furthermore, solutions or formulations containing agricultural nutrients and the like in addition to urea can be used in conjunction with the antimetabolites of the present invention without affecting their performance.

The compounds of the present invention have in common the property of not affecting to any apparent degree the activities of beneficial microorganisms (e.g., crop plants) other than those which produce urease.

In accordance with the present invention, the amount of antimetabolite used on a given area of soil and/or with a given amount of urea is not critical. However, from the standpoint of economy, it is considered that satisfactory results are generally obtained when between about 0.2 gram per acre and about 2000 grams per acre of antimetabolite are used in conjunction with about every 300 pounds or less per acre of urea nitrogen. By the term "urea nitrogen" is meant the nitrogen derived from urea. Thus, 643 pounds of urea are required to supply 300 pounds of urea nitrogen. Preferably, between about 2 grams per acre and about 200 grams per acre of antimetabolite are used for about every 300 pounds or less per acre of urea nitrogen. Optimum application values will depend on soil characteristics (e.g., moisture content), temperature, and time of application. Generally, between about 11 grams per acre and about 22 grams per acre of the antimetabolites of the present invention are most preferred for about every 300 pounds or less per acre of urea nitrogen. Thus, when 11 grams of pyridine-3-sulfonic acid are applied to an acre of soil together with sufficient urea ot provide 100 pounds of nitrogen, the amount of ammonia lost to the atmosphere over a period of two weeks equals about 30% of the amount lost in the absence of the antimetabolite. With 22 grams of antimetabolite per acre, the ammonia losses were reduced by 42%. These values were substantially unchanged by high or low soil moisture. At 300 pounds of urea-derived nitrogen per acre, 22 grams of pyridine-3-sulfonic acid per acre reduced ammonia loss by about 33% over a period of two weeks. After eleven weeks, both 11 and 22 grams of pyridine-3-sulfonic acid per acre still show activity.

The tendency of ammonia to escape from the soil as well as the efficacy of the antimetabolite compositions of the present invention are affected by the moisture content of the soil only to a small degree. Thus, at soil moisture levels above about 5% by weight, losses for a given soil with no pyridine-3-sulfonic acid are virtually independent of moisture. At 22 grams pyridine-3-sulfonic acid per acre, inhibition of ammonia loss increases with increasing moisture, levelling off at about 8% soil moisture.

The following examples are presented for the purpose of illustrating the fertilizer compositions of the present invention and the method of applying them to the soil. Percentages are by weight unless otherwise indicated.

EXAMPLE I

Urea is applied to soil having a pH of 7.0 and moisture content of 5% in an amount corresponding to 300 pounds of urea nitrogen per acre. Desthiobiotin is added at the rate of 22 grams per acre and both compounds are leached into the soil with water until the total moisture content is about 10%. The soil is maintained at room temperature (about 68–70° F.) and air is swept through the area above the soil surface so that a complete change of air is accomplished in 6 minutes. The exhaust is bubbled through a sulfuric acid solution, with the ammonia produced being carried into this solution. The acid is titrated daily with a normalized sodium hydroxide solution and the amount of ammonia volatilized is calculated. Soil containing urea but no desthiobiotin is run concurrently under the same conditions. The following table shows the cumulative percent of ammonia lost from the soil as a function of time.

| Time after application of urea to soil (days) | Cumulative percent of urea volatilized as ammonia | |
|---|---|---|
| | With desthiobiotin | Without desthiobiotin |
| 2 | 3.6 | 7.3 |
| 3 | 4.5 | 16.3 |
| 4 | 6.6 | 19.5 |

EXAMPLE II

The same conditions as in Example I are used, except that pyridine-3-sulfonic acid is substituted for desthiobiotin. The results are summarized in the following table.

| Time after application of urea to soil (days) | Cumulative percent of urea volatilized as ammonia | |
|---|---|---|
| | With pyridine-3-sulfonic acid | Without pyridine-3-sulfonic acid |
| 1 | 0.6 | 0.9 |
| 2 | 2.0 | 6.1 |
| 3 | 3.8 | 13.7 |

EXAMPLE III

The procedure of Example 1 is repeated except that urea is applied at the rate of 100 pounds of nitrogen per acre to the soil surface and pyridine-3-sulfonic acid is applied at the rate of 11 grams per acre. At about 4.5 days after application of the urea to the soil, the cumulative percent of urea nitrogen volatilized as ammonia is 6.4%. At about 12 days, this figure increases only to 7.8%. Thus the rate of loss appears to decrease with increasing time. A control sample of fertilizer applied ot soil at the rate of 100 pounds of urea nitrogen per acre but without the addition of antimetabolite shows ammonia loss of 11% in 5 days and 17.2% in 12 days.

EXAMPLE IV

Pyridine-3-sulfonic acid, oxythiamine chloride and o-chloro-p-aminobenzoic acid are added in amounts ranging from about 900 to about 7,200 grams per acre to different areas of soil fertilized with urea. Corn is planted therein and its growth observed with 900 to 7,200 grams per acre of the above antimetabolite materials. No adverse effects on the corn plants are noted.

EXAMPLE V

Using the conditions as in Example III, but at ambient summer temperatures of 90–98° F., the results given in the following table are obtained:

| Time after application of urea to soil (days) | Cumulative percent of urea volatilized as ammonia | |
|---|---|---|
| | With pyridine-3-sulfonic acid | Without pyridine-3-sulfonic acid |
| 4 | 5.1 | 9.2 |
| 11 | 7.3 | 12.8 |
| 19 | 8.8 | 14.6 |

EXAMPLE VI

Pyridine-3-sulfonic acid is incorporated into a fatty acid-kaolin coating of urea prills, with the pyridine-3-sulfonic acid at 0.02%, the fatty acid at 0.3% and the kaolin at 0.3% of the urea. This coating gives 11 grams per acre of the antimetabolite when the urea is applied to the soil at 105 pounds urea nitrogen per acre. The urea prills are applied to soil having pH 7.0 and moisture content 8%. Soil temperature is about 70° F. The fertilizer pellets are not washed into the soil but are covered with a thin layer of soil to simulate field dispersal. An identical sample lacking only the pyridine-3-sulfonic acid is run concurrently. The results obtained are given in the table below:

| Time after application of urea to soil (days) | Cumulative percent of urea volatilized as ammonia | |
|---|---|---|
| | With pyridine-3-sulfonic acid | Without pyridine-3-sulfonic acid |
| 4 | 2.0 | 4.8 |
| 12 | 4.7 | 9.7 |
| 21 | 5.5 | 10.6 |

The above examples are provided for the purpose of illustrating some preferred embodiments of the present invention as well as illustrating the utility and efficacy thereof. It is of course understood that changes and variations can be made in the procedures and compositions of the present invention without departing from the spirit and scope thereof as defined in the following claims.

We claim:
1. A process for fertilizing soil comprising:
   (a) adding urea to the soil; and
   (b) adding to said soil an antimetabolite of urease-producing microorganisms selected from the group consisting of pyridine-3-sulfonic acid, desthiobiotin, oxythiamine chloride, gamma-benzene hexachloride, and o-chloro-p-aminobenzoic acids, said anti-metabolite of urease-producing microorganisms being added to the soil in an amount between about 0.2 gram per acre and about 2000 grams per acre for about every 300 pounds or less per acre of urea-nitrogen added thereto.
2. A process according to claim 1 wherein the antimetabolite of urease-producing microorganisms is pyridine-3-sulfonic acid.
3. A process according to claim 2 wherein the pyridine-3-sulfonic acid is added to the soil in an amount between about 2 grams per acre and about 200 grams per acre for about every 300 pounds or less per acre of urea-nitrogen added thereto.
4. A process according to claim 3 wherein the pyridine-3-sulfonic acid is added to the soil in an amount between about 11 grams per acre and about 22 grams per acre for about every 300 pounds or less per acre of urea-nitrogen added thereto.
5. A process according to claim 4 wherein the pyridine-3-sulfonic acid is added to the soil in an amount between about 11 grams per acre and about 22 grams per acre for about every 100 to 300 pounds per acre of urea-nitrogen added thereto.

6. A process according to claim 1 wherein the antimetabolite of urease-producing microorganisms is desthiobiotin.

7. A process according to claim 6 wherein the desthiobiotin is added to the soil in an amount between about 2 grams per acre and about 200 grams per acre for about every 300 pounds or less per acre of urea-nitrogen added thereto.

8. A process according to claim 7 wherein the desthiobiotin is added to the soil in an amount between about 11 grams per acre and about 22 grams per acre for about every 300 pounds or less per acre of urea-nitrogen added thereto.

9. A process according to claim 8 wherein the desthiobiotin is added to the soil in an amount between about 11 grams per acre and about 22 grams per acre for about every 100 to 300 pounds per acre of urea-nitrogen added thereto.

10. A process according to claim 1 wherein the antimetabolite of urease-producing microorganisms is oxythiamine chloride.

11. A process according to claim 10 wherein the oxythiamine chloride is added to the soil in an amount between about 2 grams per acre and about 200 grams per acre for about every 300 pounds or less per acre of urea-nitrogen added thereto.

12. A process according to claim 11 wherein the oxythiamine is added to the soil in an amount between about 11 grams per acre and about 22 grams per acre for about every 300 pounds or less per acre of urea-nitrogen added thereto.

13. A fertilizer comprising urea and an antimetabolite of urease-producing microorganisms selected from the group consisting of pyridine-3-sulfonic acid, desthiobiotin, oxythiamine chloride, gamma-benzene hexachloride, and o-chloro-p-aminobenzoic acid, the amount of said antimetabolite of urease-producing microorganisms in said fertilizer being between about 0.2 gram and about 2000 grams for about every 300 pounds or less of urea-nitrogen therein.

14. A fertilizer according to claim 13 wherein the antimetabolite of urease-producing microorganisms is pyridine-3-sulfonic acid.

15. A fertilizer according to claim 14 wherein the amount of pyridine-3-sulfonic acid in said fertilizer is between about 2 grams and about 200 grams for about every 300 pounds or less of urea-nitrogen.

16. A fertilizer according to claim 15 wherein the amount of pyridine-3-sulfonic acid in said fertilizer is between about 11 grams and about 22 grams for about every 300 pounds or less of urea-nitrogen.

17. A fertilizer according to claim 13 wherein the antimetabolite of urease-producing microorganisms is desthiobiotin.

18. A fertilizer according to claim 17 wherein the amount of desthiobiotin in said fertilizer is between about 2 grams and about 200 grams for about every 300 pounds or less of urea-nitrogen.

19. A fertilizer according to claim 18 wherein the amount of desthiobiotin in said fertilizer is between about 11 grams and about 22 grams for about every 300 pounds or less of urea-nitrogen.

20. A fertilizer according to claim 13 wherein the antimetabolite of urease-producing microorganisms is oxythiamine chloride.

21. A fertilizer according to claim 20 wherein the amount of oxythiamine chloride in said fertilizer is between about 2 grams and about 200 grams for about every 300 pounds or less of urea-nitrogen.

22. A fertilizer according to claim 21 wherein the amount of oxythiamine chloride in said fertilizer is between about 11 grams and about 22 grams for about every 300 pounds or less of urea-nitrogen.

References Cited

UNITED STATES PATENTS

| | | | |
|---|---|---|---|
| 3,011,885 | 12/1961 | Goring | 71—1 |
| 3,047,377 | 7/1962 | Goring | 71—1 |
| 3,232,740 | 2/1966 | Sor et al. | 71—28 |

OTHER REFERENCES

West et al.: Textbook of Biochemistry, The MacMillian Company, N.Y. Qp 514 W38, pp. 701, 716 and 731.

REUBEN FRIEDMAN, Primary Examiner

C. N. HART, Assistant Examiner

U.S. Cl. X.R.

71—64